June 12, 1956 J. I. FRANKE 2,750,310
MANUFACTURE PROCESS OF DOPED GERMANIUM CRYSTALS
Filed July 7, 1955
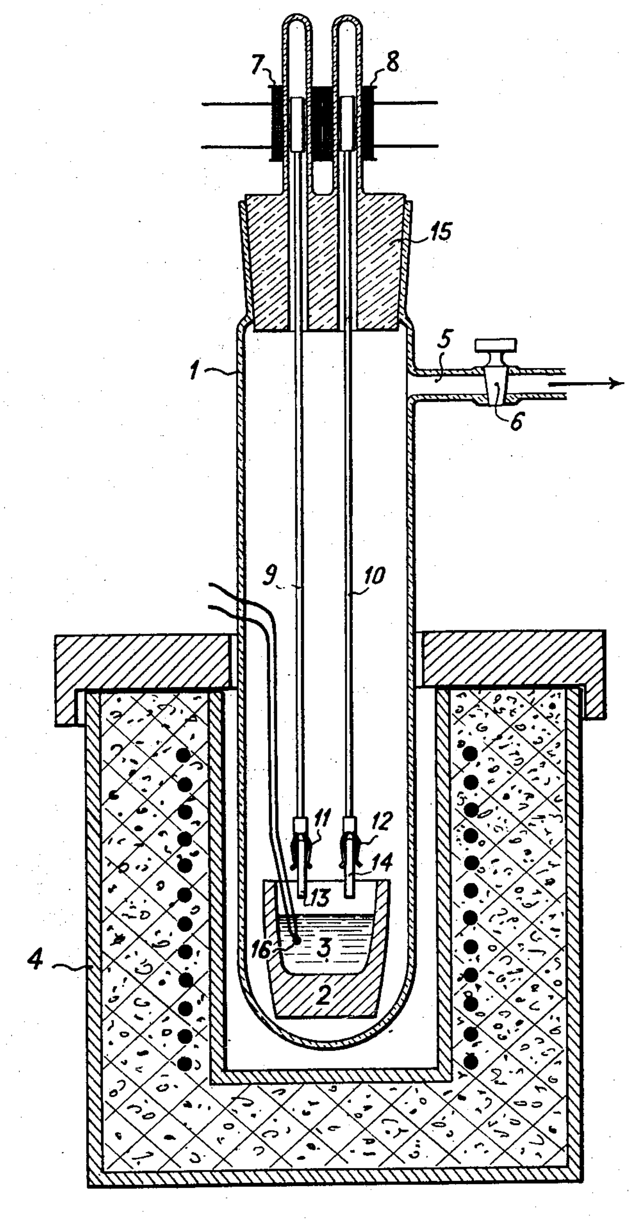
INVENTOR
JOACHIM IMMANUEL FRANKE
BY Wenderoth, Lind & Ponack
Attys.

United States Patent Office 2,750,310

Patented June 12, 1956

2,750,310

MANUFACTURE PROCESS OF DOPED GERMANIUM CRYSTALS

Joachim I. Franke, Paris, France

Application July 7, 1955, Serial No. 520,571

Claims priority, application France July 17, 1954

4 Claims. (Cl. 148—1.5)

The present invention relates to a process for manufacturing germanium crystals having zones or "layers" of semi-conductivity of opposite types.

It is known that the addition of certain impurities to a crystal of germanium gives it either a conductivity which is due to excess of electrons (the n-type) or a conductivity which is due to deficiency of electrons (the p-type). In an electric field, a potential barrier is produced at the junction between two layers having conductivities of opposite types.

The operation consisting of introducing into a particular zone of a germanium crystal a given impurity is generally known by the name "doping."

In the prior art, the methods of doping principally employed are the following:

1. Withdrawing a crystal from a bath of molten germanium containing initially an impurity of the n-type or an impurity of the p-type and introducing into the bath, in the course of the growth of the crystal, a complementary impurity of the opposite type (see Bull, Teal, Sparks and Buhler, Physical Review 1951, 81, page 637).

2. Withdrawing a crystal from a bath of molten germanium containing, simultaneously and in well defined proportions, an impurity of the n-type and an impurity of the p-type, the segregation factors of which vary with the speed of crystallisation of the nucleus. The crystal is withdrawn from the bath while rotating it on itself and at the low speeds of rotation, which correspond to the low speeds of crystallisation, a doped crystal of the p-type is obtained, whilst, at greater speeds of rotation, and therefore of crystallisation, a dopted crystal of the n-type is obtained (see R. N. Hall, Physical Review, 1952, 88, page 139).

3. Introduction of an impurity of the opposite type at the surface of a crystal of germanium of the n-type or of the p-type by thermo-diffusion or fusion of this impurity at high temperatures. By changing, by this process, the character of the semi-conductivity of the zone near one of the surfaces of a small plate of germanium, barriers of the type n-p or p-n are obtained and, by operating, at the same time on the zones near the two surfaces of the small plate, barriers n-p-n or p-n-p are obtained (see R. N. Hall and W. C. Dunlar, Physical Review, 1950, 80, page 467; W. C. Dunlar and D. E. Brown, Physical Review, 1952, 86, page 417; K. Lehovec and E. Belmont, Journal of Applied Physics, 1953, 24, page 1482).

4. Introduction of a crystal of germanium into an electrolytic solution of a salt of an impurity of the n- or p-type. For a given polarity of the electrolysis voltage, the germanium is attacked; for the opposite polarity, a deposit is formed, of the impurity in solution, on the crystal of germanium (see J. M. Tiley and R. A. Williams, Proceedings of the Institute of Radio Engineers, December 1953, pages 1706 to 1709).

The methods which have just been referred to have certain drawbacks.

In the first method, the first impurity is, necessarily, kept in the bath when the second impurity is added for producing the barrier. The presence of the first impurity greatly increases the conductivity of the part of the crystal that is doped with the second impurity.

The second process is limited in its applications. It can be applied only to impurities, the segregation factor of which changes markedly with the speed of crystallisation. Moreover, the layer of the p-type of the crystal treated always also contains an impurity of the n-type and vice versa. In addition, a crystallising plant of very high quality is required.

The third process does not allow the thickness of the intermediate layer to be determined sufficiently accurately when the zones near the two parallel faces of the germanium plate are simultaneously treated for the manufacture of a transistor with an n-p-n or a p-n-p junction, because it is difficult to direct the diffusion, and the treated layers are neither strictly flat nor parallel with the precision required of a few microns. In other words, the thickness of the treated layers in the neighbourhood of the surfaces is not constant for the whole of the surface.

The fourth or electrochemical process does not allow of the deposition of a well crystallised layer, and the result of this is that the life of the current carriers, and, consequently, the quality of the barrier, are impaired.

According to the present invention, the process of doping a crystal of germanium with an impurity of a given type of conductivity consists in introducing, into a liquid bath of a suitable semi-conducting body, a crystal of germanium of this type of conductivity and leaving the germanium to dissolve in the bath and the said bath to become saturated with germanium dissolved at a certain temperature which is lower than the melting point of germanium. When the saturation equilibrium has been reached, there are introduced, into the same bath, crystals of germanium doped with an impurity of the opposite type of conductivity. These small plates remain, unattacked, in equilibrium with the saturated bath. If the temperature is lowered, the dissolved germanium, of the initial type of conductivity, becomes deposited on the small plates of germanium having the opposite type of conductivity, thus forming a barrier.

The liquid bath is a molten semi-conductor having the same crystal lattice as germanium, that is to say, a cubic lattice, and lattice distances of the same order of magnitude as those of germanium, i. e. 2.50 angstroms. Moreover, it is essential that the melting point of the bath should be lower than that of germanium in order that it should be possible to immerse small plates of germanium in the bath without causing them to melt. The lattice distance of germanium is 2.44 angstroms and its melting point is 958° C.

Having regard to these conditions, the liquid bath may be indium antimonide InSb, gallium antimonide GaSb, or gallium arsenide GaAs, the melting points and the lattice distances of which are as follows:

| | InSb | GaSb | GaAs |
|---|---|---|---|
| Melting points in degrees centigrade | 523 | 702 | 700 |
| Lattice distance in angstroms | 2.80 | 2.62 | 2.44 |

By way of example, applicant has manufactured n-p and n-p-n barriers as follows:

A small plate of doped germanium of the n-type, for example germanium, doped with arsenic, having a resistivity of the order of 10 ohms per centimeter, is immersed in a bath of indium antimonide kept at a temperature between 650 and 700° C. The bath is stirred and becomes saturated with germanium of the n-type. The small plate of germanium is left in this way for about ten minutes in the bath and it is then withdrawn.

A mono-crystal of doped germanium of the p-type, for example germanium doped with gallium having a resistivity of the order of 4 ohms per centimeter is immersed in the bath, care being taken to keep it, before immersing it in the bath, for a few minutes, near the surface of the latter until a temperature equilibrium between the bath and the crystal is obtained.

After introducing the crystal into the bath, the temperature of the bath is lowered slowly, for example in ten minutes, to between 600 and 650° C. After the crystal is cooled, the thickness of the layer of germanium of the n-type, which has been deposited, is brought to the desired size by known methods of mechanical and chemical action.

The operation is then recommenced, using a bath of indium antimonide saturated with germanium of the p-type, and small plates of germanium are thus obtained having alternately layers of the n-type and layers of the p-type.

If gallium antimonide or gallium arsenide were used, the temperatures which have just been mentioned should be increased by about 75° C.

The drawing represents apparatus which can be used for carrying out the process.

1 denotes a quartz tube in the bottom of which is located a crucible 2 containing molten indium antimonide 3. The lower part of the tube is embedded in an electric furnace which can be raised to a regulatable temperature of between 500 and 1000° C. The quartz tube is in communication, through a pipe 5 and a cock 6, either with a vacuum pump or with an atmosphere of inert gas, nitrogen for example. The tube 1 is closed by a ground stopper 15 which comprises, on its upper part, two coils 7 and 8 with plunging cores. The plunging cores of the coils continue as rods 9 and 10 which are terminated by clips 11 and 12, the former holding a germanium crystal 13 of the n-type and the latter holding a germanium crystal 14 of the p-type.

On breaking the circuit of the coil 7, the crystal 13 is immersed for about ten minutes in the bath 3, the temperature of the furnace being regulated to 650° C. The circuit of the coil 7 is then closed again and the circuit of the coil 8 is broken. The result of this is that the crystal 13 is lifted from the bath 3 and the crystal 14 is immersed in the bath. The temperature of the furnace is then brought to about 600° C. in about ten minutes and, during this time, a layer of germanium of the n-type is deposited on the crystal 14. The temperature of the bath 3 is watched by a thermo-couple 16.

What I claim is:

1. A process for manufacturing germanium crystals having zones or "layers" of semi-conductivity of opposite types, comprising the following steps: introducing, into a bath consisting of a molten semi-conductive body which has a melting point lower than that of germanium and crystallises in a cubic system and has a lattice distance of the order of 2.50 angstroms, a germanium crystal of a given type of conductivity, for a time that is sufficient for it to dissolve to saturation in the molten semi-conductive body and, when the saturation equilibrium has been reached, introducing into the same bath a germanium crystal of an opposite type of conductivity, the temperature being lowered so that the dissolved germanium is deposited on the secondly mentioned germanium crystal.

2. A process according to claim 1, wherein the temperature of the bath for dissolving the first mentioned germanium crystal is about 650 to 700° C., the molten semi-conductive body is indium antimonide and the temperature for the deposition of germanium on the secondly mentioned germanium crystal is about 600 to 650° C.

3. A process according to claim 1, wherein the temperature of the bath for dissolving the first mentioned germanium crystal is about 725 to 825° C., the molten semi-conductive body is gallium antimonide and the temperature for the deposition of germanium on the secondly mentioned germanium crystal is 675 to 725° C.

4. A process according to claim 1, wherein the temperature of the bath for dissolving the first mentioned germanium crystal is about 725 to 825° C., the molten semi-conductive body is gallium arsenide and the temperature for the deposition of germanium on the secondly mentioned germanium crystal is 675 to 725° C.

References Cited in the file of this patent

UNITED STATES PATENTS 2,689,930 Hall ---------------- Sept. 21, 1954
2,727,839 Sparks -------------- Dec. 20, 1955